United States Statutory Invention Registration [19]

[11] Reg. Number: H18

Bracuti et al. [45] Published: Feb. 4, 1986

[54] REDUCTION OF EROSION AND MUZZLE FLASH OF GUN TUBES

[75] Inventors: Arthur J. Bracuti, Randolph; Louis A. Bottei, Hackettstown, both of N.J.

[73] Assignee: The United States of America as represented by the Secretary of the Army, Washington, D.C.

[21] Appl. No.: 553,672

[22] Filed: Nov. 21, 1983

[51] Int. Cl.[4] ..... F42B 5/02

[52] U.S. Cl. ..... 102/435; 149/95

[58] Field of Search ..... 102/435, 285, 530, 531; 149/95, 2

[56] References Cited

U.S. PATENT DOCUMENTS

| | | | |
|---|---|---|---|
| 1,187,779 | 6/1916 | Patten | 102/285 X |
| 3,392,669 | 7/1968 | Picard | 102/435 |
| 3,426,684 | 2/1969 | Jacobson et al. | 102/435 |
| 3,928,964 | 12/1975 | Hamilton | 102/530 X |
| 4,066,415 | 1/1978 | Kasama et al. | 102/531 |

OTHER PUBLICATIONS

Bracuti et al., CPIA Publication 370, Vol. 11, Feb. 1983, pp. 273–280.

*Primary Examiner*—Harold J. Tudor
*Attorney, Agent, or Firm*—Anthony T. Lane; Harold H. Card, Jr.; Edward F. Costigan

[57] ABSTRACT

Gun barrel erosion and muzzle flash are reduced by introducing a compound of the group of ammonium and potassium carbonates and -bicarbonates into the gun chamber containing the propellant charge. In addition to reducing erosion and muzzle flash, ammonium carbonate and ammonium bicarbonate provide no detectable increase in smoke levels produced.

6 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

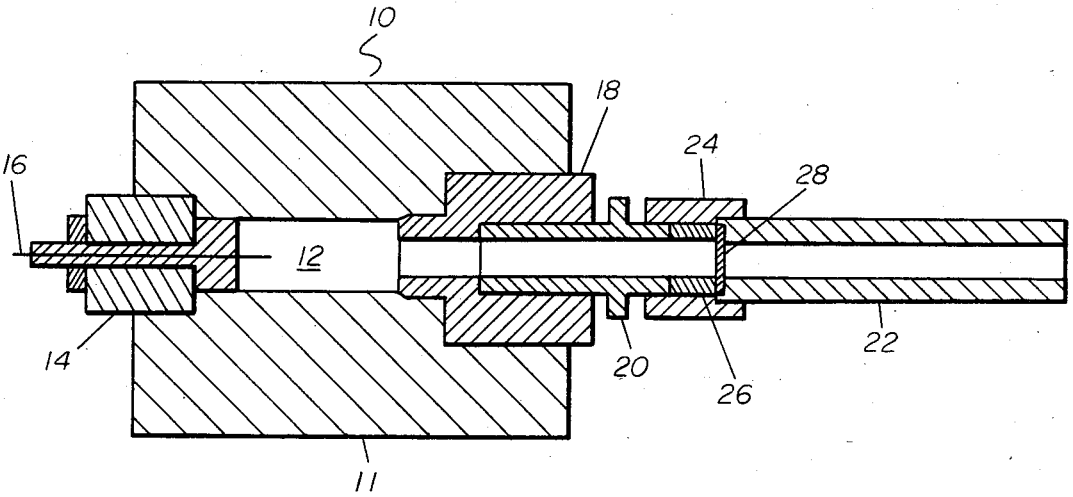
10
18
24
28
16
12
14
20
26
22
11

REDUCTION OF EROSION AND MUZZLE FLASH OF GUN TUBES

GOVERNMENT RIGHTS

The invention described herein may be manufactured, used and licensed by or for the Government for Governmental purposes without payment to us of any royalties thereon.

BACKGROUND OF THE INVENTION

The present invention relates to a method for reducing both the erosion and muzzle flash of gun barrels.

The trend of military requirement is toward ever-increasing muzzle velocities and ranges of projectiles. These increased requirements call for more energetic propellants, which in turn cause increased erosion of gun tubes due primarily to the hot gases generated when the propellants are fired.

Various techniques have been employed for reducing erosion of gun barrels. One method comprises plating, coating or lining the bore of the gun tube with a material more resistant to erosion than the gun steel, but this method has not been completely satisfactory.

The most satisfactory methods of reducing gun barrel wear include the addition of "wear additives" to the propelling charge, such as sheaths of polyurethane foam or super-slurper (a water gelled starch acrylonitrile copolymer) around the propellant, silicones such as dimethylsilicone, and mixtures of paraffin wax and titanium dioxide and/or talc. These additives have not been completely satisfactory, since they create other problems, such as residue formation with unpredictable effects on ballistics, smoke and midbore barrel wear.

The reduction of muzzle flash has been accomplished by use of the following principal methods: (a) addition of inorganic flash suppressants, e.g. potassium sulfate and potassium nitrate; (b) formulation of the propellant by including the inorganic flash suppressant as part of the propellant composition; (c) formulation of propellant having low isochoric flame temperatures; and (d) addition of a mechanical device to the muzzle. The addition of a mechanical device to the muzzle is cumbersome and hence impractical, while the use of low flame temperature propellants is precluded for future artillery systems in view of the requirement for higher muzzle velocities and greater ranges. Consequently, the two methods for flash reduction which have been predominantly employed are the addition of chemical flash suppressants separately to the propellant, and propellant formulations containing the flash suppressants. Of these methods the former is preferred, since it permits optimum location of the suppressant for each propellant charge and can be used with stockpiled charges, whereas the latter method does not permit optimization of suppressant location and cannot be used with stockpiled charges.

Current propellants frequently utilize an inorganic flash suppressant along with a wear reducer, such as a mixture of wax and talc and/or titanium dioxide. Flash suppressants presently employed with nitrocellulose based "smokeless powder", namely, potassium sulfate and potassium nitrate, produce smoke. Ideally, the flash suppressant should not contribute any smoke to the system.

SUMMARY OF THE INVENTION

A principal object of the present invention is to provide a method and novel additives for reducing both the erosion (wear) and muzzle flash of gun tubes caused by the firing of propelling charges therein.

Another object of this invention is to provide a method and additives for reducing smoke as well as erosion and muzzle flash of gun tubes.

These and other objects can be achieved in accordance with the present invention by employing in conjunction with the propellant charge at least one additive selected from the group consisting of ammonium bicarbonate, ammonium carbonate, potassium bicarbonate and potassium carbonate. Besides their ability to reduce gun tube erosion and muzzle flash, ammonium carbonate and -bicarbonate- unlike the potassium carbonates produce no smoke.

BRIEF DESCRIPTION OF THE DRAWING

The drawing shows a cross-sectional schematic view of a modified closed bomb employed to test the effectiveness of the method and additives of the present invention for reducing the erosion and muzzle flash of gun tubes.

DETAILED DESCRIPTION OF THE INVENTION

The novel additive compounds can be effectively used with gun propellants in various ways. Preferably, the novel additives are utilized in finely divided particulate, e.g. powder, form. For optimum results the novel additive compounds are placed in particulate form in front of the propellant charge in the gun chamber. For example, in an ammunition cartridge containing a propellant charge and a projectile attached to the forward end of the cartridge casing, the novel additive compound is advantageously located in front of the propellant charge between the projectile and the propellant charge. A positive but less efficient reduction of gun tube erosion and muzzle flash can be obtained when the novel additive is admixed with the propellant grains. Also, the novel additives can be employed in conjunction with known additives for reducing erosion, e.g. talc and $TiO_2$, as well as with additives for reducing muzzle flash, e.g. $K_2SO_4$ and $KNO_3$. Further, the novel additives can be utilized with a support or carrier, such as paraffin wax, plastic films, textiles, etc., which can be wrapped around, placed in front of or otherwise disposed with respect to the propellant charge in a manner similar to that employed with known additives.

The novel additive compounds of the present invention are employed in an amount sufficient to effect a reduction of the gun barrel erosion and muzzle flash resulting from the firing of the propellant charge. The novel additives are particularly effective for reducing erosion and muzzle flash produced from nitrocellulose based propellants, especially high energy double and triple based nitrocellulose propellants. Good results are obtained by employing the novel additive compounds in amounts ranging from about 1% to 10% by weight of such nitrocellulose based propellants, although larger amounts can be effectively used. Ammonium carbonate and ammonium bicarbonate are particularly advantageous, since they produce no smoke in addition to being highly effective for reducing gun tube erosion and muzzle flash.

The effectiveness of the novel and prior art additives was tested in a modified 200 cc closed bomb vented with a 91.44 cm. (36 in.) barrel having a 0.95 cm. (0.375 in) bore. The unmodified bomb was utilized by applicants in previous erosion studies reported in the Journal of Ballistics Vol. 5, No. 2 pages 1083–1111 (1981). In tests with the additives of the present invention, since secondary muzzle flash was not observed with unsuppressed propellant using the 91.44 cm. barrel, the bomb was modified by shortening the barrel to 22.86 cm (9 in.), as shown in the drawing, whereby secondary muzzle flash occurred on each firing with unsuppressed propellant.

Referring to the drawing, the test bomb 10 included a steel block 11 containing a 200 cc cylindrical firing chamber 12. The rearward end of the chamber was closed by a plug 14 including an electric firing pin 16, while the forward end contained a plug 18 with a central bore for receiving one end of a tubular adapter 20. The other end of the adapter was connected to the barrel 22 by a coupling 24. A removable steel cylinder or sleeve 26, 2.7 cm. long with a 0.95 cm. bore, which functioned as the erosion indicator, was placed between the adapter and the barrel and a stainless steel blow-out disc 28 was inserted between the erosion sleeve and the barrel.

The erosion sleeve was cleaned and weighed before each firing and then cleaned and weighed after each firing. The amount of weight loss during each firing was used as an index of erosion (mg loss per firing).

A pressure transducer was positioned within the 200 cc. chamber of the test bomb and was connected to a Nicolet Digital Oscilloscope calibrated to display pressure versus time.

The secondary muzzle flash was measured simultaneously with a silicon diode detector which reproduced the spectral response of the human eye. With this arrangement a spectral-time trace of each shot fired was recorded on the oscilloscope. These traces revealed the flash onset time from initiation, the flash peak intensity and time of occurrence, flash termination time, and the integrated intensity.

In each case the propellant charge was standardized at a loading density of 0.25 g/cc by loading 50 g. of M30 propellant (Radford lot no. 69531, Web of 0.045) in a polyethylene bag. This loading density was chosen to maintain an average peak pressure of 172 MPA (25,000 psi) throughout the experiments. In the case of suppressed charges, 4 g. of the additive were positioned in a loose powdered condition in front of the bagged propellant charge. Prior to testing each candidate additive, flash and erosion data were obtained for the M30 propellant charge in the absence of the additive. All succeeding flash intensity values obtained from propellant charges with additives were normalized to a common relative intensity seale by dividing each flash intensity value by the flash intensity value obtained from the propellant charge without the suppressant additive. The tests compared the efficiencies of the novel additives and the traditional erosion additives talc and titanium dioxide ($TiO_2$) and traditional flash suppressants potassium sulfate ($K_2SO_4$) and potassium nitrate ($KNO_3$).

The M30 propellant used had the composition shown in Table I:

TABLE I

| Component | Composition % |
|---|---|
| Nitrocellulose (12.6%) | 28.00 |

TABLE I-continued

| Component | Composition % |
|---|---|
| Nitroglycerin | 22.50 |
| Nitroguanidine | 47.70 |
| Ethyl centralite | 1.50 |
| Graphite | 1.10 |
| Cryolite | 0.30 |
| Ethanol (residual) | 0.30 |

The test results are shown in Table 2, which indicate that the novel additives (1) reduce gun tube erosion and muzzle flash considerably below the levels produced from the propellant without additive;

(2) are considerably more efficient for reducing erosion than talc and are essentially equal to $TiO_2$; and (3) are equal or superior to $K_2SO_4$ and $KNO_3$ for reducing muzzle flash.

The results also show that (4) potassium and ammonium bicarbonates and ammonium carbonate are considerably more effective than the aforesaid traditional flash and erosion additives for reducing both gun barrel erosion and muzzle flash; and (5) ammonium carbonate and ammonium bicarbonate are unique, since in addition to markedly reducing flash and erosion, they provide no detectable increase in smoke produced over that produced from the propellant without additive.

TABLE II

Flash and Erosion Data

| Additive | Boiling Point, °K., | Flash $I/I_o$ | Erosivity mg/shot | Smoke |
|---|---|---|---|---|
| None | — | 100 | 38 | Yes |
| Talc | — | 100 | 18 | Yes |
| $TiO_2$ | — | 100 | 7 | Yes |
| $K_2SO_4$ | 1962 | 80 | 17 | Yes |
| $KNO_3$ | 673* | 46 | 28 | Yes |
| $K_2CO_3$ | 1173* | 46 | 6 | Yes |
| $KHCO_3$ | 313* | 1 | 4 | Yes |
| $NH_4HCO_3$ | 373* | 11 | 8 | No |
| $(NH_4)_2CO_3$ | 331* | 17 | 6 | No |

*decomposes

The ammonium bicarbonate additive was also field tested in a lightweight recoilless gun (LWRG), a portable shoulder mounted 81 mm fiber glass launcher which fires a SMAW warhead at a muzzle velocity of 244 m/sec (800 Fps) using a standard propelling charge consisting of 454 g (1 lb.) of a double base propellant of the composition

| | |
|---|---|
| nitrocellulose (12.6% N) | 49.0% |
| nitroglycerin | 42.0 |
| 2-nitrodiphenylamine | 2.0 |
| di-n-propyl adipate | 1.5 |
| normal lead β-resorcylate | 2.5 |
| monobasic cupric β-resorcylate | 2.5 |
| carbon black | 0.5 |

Test firings were made with the standard propellant and with the propellant using 36.3 g (1.3 oz.) of powdered ammonium bicarbonate packed between the propellant and the warhead.

The results of the test firings were as follows: When the standard propellant charge was employed, the blast overpressure value produced was 0.021 MPA (3.0 psi), and a large fireball or secondary muzzle flash (which contributed to the blast overpressure) was observed. The addition of the ammonium bicarbonate to the propelling charge reduced the secondary flash and lowered the blast overpressure level by 56% to 0.0896 (1.3 psi) without any increase in smoke levels produced.

We claim:

1. In an improved propellant for generating gases for propelling a projectile through the bore of a gun barrel, said propellant containing nitrocellulose, the improvement consisting of a bicarbonate additive selected from the group consisting of potassium bicarbonate and ammonium bicarbonate for use in reducing muzzle-flash from said gun-barrel during firing, said bicarbonate being present in an amount between about 1 to 10 percent by weight based on the weight of said propellant charge.

2. The propellant of claim 1 wherein said additive is potassium bicarbonate.

3. The propellant of claim 1 wherein said additive is ammonium bicarbonate.

4. In a method for reducing muzzle-flash when firing a propellant charge in a gun chamber, the improvement consisting of introducing a bicarbonate in said chamber with said propellant during firing, said bicarbonate selected from the group consisting of ammonium and potassium bicarbonate, and being present in an amount between about 1 to 10 percent by weight based on the weight of said propellant charge.

5. The method of claim 4 wherein said bicarbonate is potassium bicarbonate.

6. The method of claim 4 wherein said bicarbonate is ammonium bicarbonate.

* * * * *